United States Patent
Hara et al.

(10) Patent No.: US 7,920,362 B2
(45) Date of Patent: Apr. 5, 2011

(54) MAGNETIO-RESISTIVE DEVICE INCLUDING A MULTI-LAYER SPACER WHICH INCLUDES A SEMICONDUCTOR OXIDE LAYER

(75) Inventors: Shinji Hara, Tokyo (JP); Kei Hirata, Tokyo (JP); Koji Shimazawa, Tokyo (JP); Yoshihiro Tsuchiya, Tokyo (JP); Tomohito Mizuno, Tokyo (JP)

(73) Assignee: TDK Corporation, Tokyo (JP)

( * ) Notice: Subject to any disclaimer, the term of this patent is extended or adjusted under 35 U.S.C. 154(b) by 706 days.

(21) Appl. No.: 11/943,171

(22) Filed: Nov. 20, 2007

(65) Prior Publication Data
US 2008/0117554 A1 May 22, 2008

(30) Foreign Application Priority Data
Nov. 21, 2006 (JP) ................ 2006-314197

(51) Int. Cl.
*G11B 5/39* (2006.01)
(52) U.S. Cl. .................................. 360/324.1
(58) Field of Classification Search ............... 360/324.1, 360/324.11, 324.12, 324.2
See application file for complete search history.

(56) References Cited

U.S. PATENT DOCUMENTS

| | | | |
|---|---|---|---|
| 2002/0055016 A1* | 5/2002 | Hiramoto et al. | 428/692 |
| 2003/0011945 A1* | 1/2003 | Yuasa et al. | 360/324.1 |
| 2006/0067017 A1 | 3/2006 | Yuasa et al. | |
| 2008/0138660 A1* | 6/2008 | Parkin | 428/812 |
| 2008/0218907 A1* | 9/2008 | Mizuno et al. | 360/313 |
| 2008/0226948 A1* | 9/2008 | Mizuno et al. | 428/811.2 |
| 2008/0278864 A1* | 11/2008 | Zhang et al. | 360/324.12 |

FOREIGN PATENT DOCUMENTS
JP 2003-8102 1/2003

OTHER PUBLICATIONS
U.S. Appl. No. 12/112,598, filed Apr. 30, 2008, Hara, et al.
U.S. Appl. No. 11/626,562, filed Jan. 24, 2007, Hara, et al.
U.S. Appl. No. 11/768,435, filed Jun. 26, 2007, Tsuchiya, et al.
U.S. Appl. No. 11/865,384, filed Oct. 1, 2007, Hara, et al.
U.S. Appl. No. 11/946,358, filed Nov. 28, 2007, Shimazawa, et al.
U.S. Appl. No. 11/968,911, filed Jan. 3, 2008, Tsuchiya, et al.
U.S. Appl. No. 12/128,352, filed May 28, 2008, Mizuno, et al.

\* cited by examiner

*Primary Examiner* — Jefferson Evans
(74) *Attorney, Agent, or Firm* — Oblon, Spivak, McClelland, Maier & Neustadt, L.L.P.

(57) ABSTRACT

A giant magneto-resistive effect device having a CPP structure including a spacer layer, and a fixed magnetization layer and a free layer stacked one upon another with said spacer layer interposed between them. The free layer functions such that its magnetization direction changes depending on an external magnetic field. The spacer layer comprises a first nonmagnetic metal layer and a second nonmagnetic metal layer, each formed of a nonmagnetic metal material. A semiconductor oxide layer is interposed between them. The semiconductor oxide layer forming a part of the spacer layer comprises zinc oxide as a main ingredient.

16 Claims, 5 Drawing Sheets

MAGNETIO-RESISTIVE DEVICE INCLUDING A MULTI-LAYER SPACER WHICH INCLUDES A SEMICONDUCTOR OXIDE LAYER

BACKGROUND OF THE INVENTION

1. Field of the Invention

The present invention relates to a magneto-resistive effect device for reading the magnetic field strength of a magnetic recording medium or the like as signals, a thin-film magnetic head comprising that magneto-resistive effect device, and a head gimbal assembly and a hard disk system comprising that thin-film magnetic head.

2. Explanation of the Prior Art

With recent improvements in the plane recording density of hard disk systems, there has been growing demands for improvements in the performance of thin-film magnetic heads. For the thin-film magnetic head, a composite type thin-film magnetic head has been widely used, which has a structure wherein a reproducing head having a read-only magneto-resistive effect device (hereinafter often referred to as the MR (magneto-resistive) device for short) and a recording head having a write-only induction type magnetic device are stacked on a substrate.

For the MR device, there is the mention of an AMR device harnessing an anisotropic magneto-resistive effect, a GMR device harnessing a giant magneto-resistive effect, a TMR device harnessing a tunnel-type magneto-resistive effect, and so on.

The reproducing head is required to have high sensitivity and high outputs in particular. GMR heads using a spin valve type GMR device have already been mass-produced as a reproduction head possessing such performances, and to meet further improvements in plane recording densities, reproducing heads using TMR devices are now being mass-produced, too.

In general, the spin valve type GMR device comprises a nonmagnetic layer, a free layer formed on one surface of that nonmagnetic layer, a fixed magnetization layer formed on another surface of the nonmagnetic layer, and a pinned layer (generally an antiferromagnetic layer) on the side of the fixed magnetization layer facing away from the non-magnetic layer. The free layer has its magnetization direction changing depending on an external signal magnetic field, and the fixed magnetization layer has its magnetization direction fixed by a magnetic field from the pinned layer (antiferromagnetic layer).

Incidentally, common GMR heads used so far in the art have a CIP (current in plane) structure wherein a current for detecting magnetic signals (the so-called sense current) is passed parallel with the plane of each of the layers forming the GMR device (CIP-GMR device). On the other hand, GMR devices having the so-called CPP (current perpendicular to plane) structure wherein the sense current is passed perpendicularly to the plane of each of the layers forming the GMR device (CPP-GMR device), too, are now under development as next-generation ones.

The aforesaid TMR devices, too, would come under the CPP structure category according to a classification system from the current-passing direction alone. However, the multilayer construction and detection principle of the TMR device are different from those of the CPP-GMR device. That is, the TMR device generally comprises a free layer, a fixed magnetization layer, a tunnel barrier layer located between them, and an antiferromagnetic layer located on the plane of the fixed magnetization layer that faces away from its plane in contact with the tunnel barrier layer. The tunnel barrier layer is a nonmagnetic insulating layer through which electrons can pass in a state with spins reserved by the tunnel effect. The rest of the multilayer structure, i.e., the free layer, fixed magnetization layer and antiferromagnetic layer could be basically identical with those used with the spin valve type GMR device.

And now, when the TMR device is used for a reproducing head, it is required to have low resistance for the following reasons. For a magnetic disk system, there is a demand for improved recording density and improved data transfer rate, with which the reproducing head is required to have good high-frequency response. However, as the resistance value of the TMR device grows large, it will cause an increase in stray capacitances occurring at the TMR device and a circuit connected to it, rendering the high-frequency response of the reproducing head worse. This is the reason the TMR device must inevitably have low resistance.

Generally speaking, reducing the thickness of the tunnel barrier layer would work for making the resistance of the TMR device low. However, too thin a tunnel barrier layer would cause a lot more pinholes to occur in the tunnel barrier layer, rendering the service life of the TMR device short. Further, there would be a magnetic couple produced between the free layer and the fixed magnetization layer, ending up with problems: a lot more noise, a drop of the MR ratio, and degradation of TMR device's performance. The noise occurring at the reproducing head is here called head noise. The head noise occurring at the reproducing head using the TMR device includes shot noise, a noise component that is unlikely to occur at a reproducing head using the GMR device. Thus, a problem with the reproducing head using the TMR device is that the head noise is noticeable.

With the CPP-GMR device, on the other hand, there is a problem that no large enough MR ratio is obtained. A possible reason for it could be that spin-polarized electrons are scattered at the interface between the nonmagnetic electroconductive layer and the magnetic layer, and in the nonmagnetic electroconductive layer.

Also, the CPP-GMR device, because of having a small resistance value, is low in terms of the amount of resistance change. For this reason, in order to obtain large reproduction output with the CPP-GMR device, high voltage must be applied to that device. However, the application of high voltage to the device offers such problems as described below. With the CPP-GMR device, currents are passed in the direction perpendicular to the plane of each layer, whereupon spin-polarized electrons are poured from the free layer into the fixed magnetization layer or from the fixed magnetization layer into the free layer. Such spin-polarized electrons cause torque (hereinafter called the spin torque) that rotates those magnetizations to be generated at the free layer or the fixed magnetization layer. The magnitude of this spin torque is proportional to the current density. As the voltage applied to the CPP-GMR device grows high, it causes the current density to grow large with the result that there is large spin torque. As the spin torque increases, there are problems such as changes in the direction of magnetization of the fixed magnetization layer, and the inability of the free layer to freely change the direction of magnetization with respect to an external magnetic field.

To solve such problems, Applicant has already filed Japanese Patent Application No. 2006-275972 to come up with an invention relating to a CPP-GMR device, with which large MR ratios are achieved while noise is held back and the influence of the spin torque is reduced.

That is, in a preferable embodiment of that invention, a spacer layer interleaved between the free layer and the fixed magnetization layer has typically a Cu/ZnO/Cu multilayer structure, and the area resistivity (AR) of a magneto-resistive effect device and the electro-conductivity of the spacer layer are determined in such a way as to fall within the given ranges.

By allowing the spacer layer to have typically a three-layer structure of Cu/ZnO/Cu according to this proposal, large MR ratios are achievable while holding back noise and reducing the influence of the spin torque.

The present invention of this application is to make improvements in or relating to Japanese Patent Application No. 2006-275972, and embodied as follows.

More specifically, as it is intended to restrict the area resistivity and electroconductivity of the device to within the given range as determined in Japanese Patent Application No. 2006-275972, the thickness of the semi-conductor layer used as the intermediate layer in the three-layer structure of the spacer layer and represented by ZnO must be as fine as about 1.2 to 2.0 nm. There would be no problem with such a range if that semiconductor layer is fabricated under strict fabrication and quality control management conditions; however, as the semiconductor layer represented by ZnO is too thin, pinholes occur due to film thickness variations during film formation, etc. This would possibly lead to a worsening of performance reliability due to such electro-migration as experienced in a so-called current-narrowing type CPP-GMR. There would be another possibility that at the time of polishing, Cu layers above and below ZnO may be short circuited, resulting in phenomena such as noise generation and deterioration of the MR change rates. Further, there would be likelihood of a disruption of crystal lattices due to film-formation conditions such as partial pressure of oxygen or the like. The thicker the film, the more noticeable this would be; that is, the volume fraction of a portion affected by the disruption of lattices would grow large as the film grows thin.

Thus, with design specifications where the semi-conductor layer used as the intermediate layer in the three-layer structure of the spacer layer is thin, there would be various troubles brought about.

For this reason, there is a demand for new specifications ensuring that the semiconductor layer used as the intermediate layer in the three-layer structure of the spacer layer can have a low device area resistivity as desired and be as thin as possible. New such specifications, of course, must ensure that there is ever higher MR performance obtained without having adverse influences on MR performance, or MR performance can be maintained at the same high level.

Note here that the prior art that seems to be most relevant to the invention of this application is JP-A-2003-8102. This prior art sets forth a CPP-GMR device comprising a fixed magnetization layer having a fixed magnetization direction, a free magnetization layer with its magnetization direction changing depending on an external magnetic field, a nonmagnetic metal intermediate layer interleaved between the fixed magnetization layer and the free magnetization layer, and a resistance control layer interleaved between the fixed magnetization layer and the free magnetization layer and formed of a material having conduction carriers of up to $10^{22}/cm^3$. The prior art shows a semiconductor as one of resistance control layer materials; however, it does not suggest at al about the requirements for the invention of this application.

SUMMARY OF THE INVENTION

According to the invention, such problems as described above are solved by the provision of a giant magneto-resistive effect device (CPP-GMR device) having a CPP (current perpendicular to plane) structure comprising a spacer layer, and a fixed magnetization layer and a free layer stacked one upon another with said spacer layer interposed between them, with a sense current applied in the stacking direction, wherein said free layer functions such that its magnetization direction changes depending on an external magnetic field, and said spacer layer comprises a first nonmagnetic metal layer and a second nonmagnetic metal layer, each formed of a nonmagnetic metal material, and a semiconductor oxide layer interposed between the first nonmagnetic metal layer and the second nonmagnetic metal layer, wherein the semiconductor oxide layer forming a part of said spacer layer comprises zinc oxide as a main ingredient, wherein said main ingredient zinc oxide contains at least one selected from among oxides containing a trivalent cation of $Al_2O_3$, $Ga_2O_3$, $In_2O_3$, and $B_2O_3$, and a tetravalent cation of $TiO_2$.

In a preferable embodiment of the magneto-resistive effect device according to the invention, said main ingredient zinc oxide contains at least one selected from among oxides containing a trivalent cation of $Al_2O_3$, $Ga_2O_3$, $In_2O_3$, and $B_2O_3$ in substitutional solid solution form.

In a preferable embodiment of the magneto-resistive effect device according to the invention, the content of the trivalent cation-containing oxide, and the tetravalent cation-containing oxide contained in said main ingredient zinc oxide is such that the semiconductor oxide layer can have lower resistance yet a larger thickness without deterioration of MR performance.

In a preferable embodiment of the magneto-resistive effect device according to the invention, the content of $Al_2O_3$ contained in said main ingredient zinc oxide is 0.1 to 15.0 mol %.

In a preferable embodiment of the magneto-resistive device according to the invention, the content of $Ga_2O_3$ contained in said main ingredient zinc oxide is 0.1 to 20.0 mol %.

In a preferable embodiment of the magneto-resistive device according to the invention, the content of $B_2O_3$ contained in said main ingredient zinc oxide is 0.1 to 15.0 mol %.

In a preferable embodiment of the magneto-resistive device according to the invention, the content of $In_2O_3$ contained in said main ingredient zinc oxide is 0.1 to 15.0 mol %.

In a preferable embodiment of the magneto-resistive device according to the invention, the content of $TiO_2$ contained in said main ingredient zinc oxide is 0.1 to 20.0 mol %.

In a preferable embodiment of the magneto-resistive device according to the invention, the semiconductor oxide layer forming a part of said spacer layer has a thickness of 2.0 to 4.0 nm.

In a preferable embodiment of the magneto-resistive device according to the invention, said first nonmagnetic metal layer, and said second nonmagnetic metal layer is at least one selected from among Cu, Au, and Ag.

In a preferable embodiment of the magneto-resistive device according to the invention, said first nonmagnetic metal layer, and said second nonmagnetic metal layer has a thickness of 0.3 to 2.0 nm.

In an preferable embodiment of the invention, the magneto-resistive effect device has an area resistivity of 0.1 to 0.3 nm.

In a preferable embodiment of the magneto-resistive device according to the invention, said spacer layer has an electroconductivity of 100 to 1,450 (S/cm).

The invention also provides a thin-film magnetic head, which comprises a plane opposite to a recoding medium, the aforesaid magneto-resistive effect device located near said medium opposite plane for detecting a signal magnetic field from said recording medium, and a pair of electrodes for passing a current in the stacking direction of said magneto-resistive effect device.

Further, the invention provides a head gimbal assembly, which comprises a slider including the aforesaid thin-film magnetic head and located in opposition to a recording medium, and a suspension adapted to resiliently support said slider.

Furthermore, the invention provides a hard disk system, which comprises a slider including the aforesaid thin-film magnetic head and located in opposition to a recording medium, and a positioning means adapted to support and position said slider with respect to said recording medium.

The invention provides a giant magneto-resistive effect device (CPP-GMR device) having a CPP (current perpendicular to plane) structure comprising a spacer layer, and a fixed magnetization layer and a free layer stacked one upon another with said spacer layer interposed between them, with a sense current applied in the stacking direction, wherein said free layer functions such that its magnetization direction changes depending on an external magnetic field, and said spacer layer comprises a first nonmagnetic metal layer and a second nonmagnetic metal layer, each formed of a nonmagnetic metal material, and a semiconductor oxide layer interposed between the first nonmagnetic metal layer and the second nonmagnetic metal layer, wherein the semiconductor oxide layer forming a part of said spacer layer comprises zinc oxide as a main ingredient, wherein said main ingredient zinc oxide contains at least one selected from among oxides containing a trivalent cation of $Al_2O_3$, $Ga_2O_3$, $In_2O_3$, and $B_2O_3$, and a tetravalent cation of $TiO_2$. It is thus possible to make thicker the semiconductor oxide layer forming a part of the spacer layer while keeping the device's area resistivity low as desired, thereby offering the advantages: much higher MR performance with much less variable device's area resistivity, and much more improved film performance reliability.

EXPLANATION OF THE PREFERRED EMBODIMENTS

The best mode for carrying out the invention is now explained in details.

Figure 1:
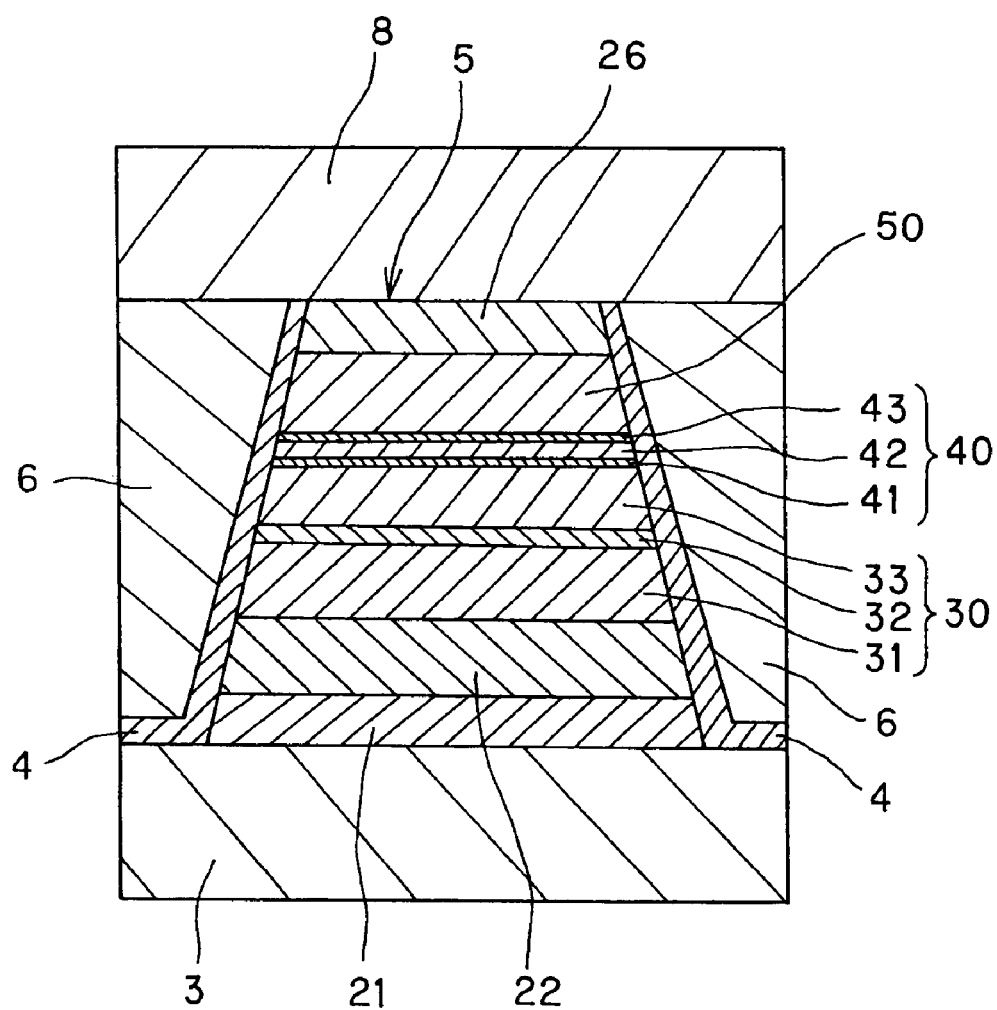
FIG. 1 is a sectional view illustrative of a section of an embodiment of the invention primarily parallel with the plane of a reproducing head in opposition to a medium.

FIG. 1 is illustrative of the ABS (air bearing surface) of the reproducing head in an embodiment of the invention; FIG. 1 is illustrative in schematic of the ABS of the giant magneto-resistive effect device (CPP-GMR device) having a CPP structure—part of the invention. The ABS is generally corresponding to a plane (hereinafter often called the medium opposite plane) at which a reproducing head is in opposition to a recording medium; however, it is understood that the ABS here includes even a section at a position where the multilayer structure of the device can be clearly observed. For instance, a protective layer of DLC (the protective layer adapted to cover the device) or the like, in a strict sense, positioned facing the medium opposite plane may be factored out, if necessary.

Figure 2:
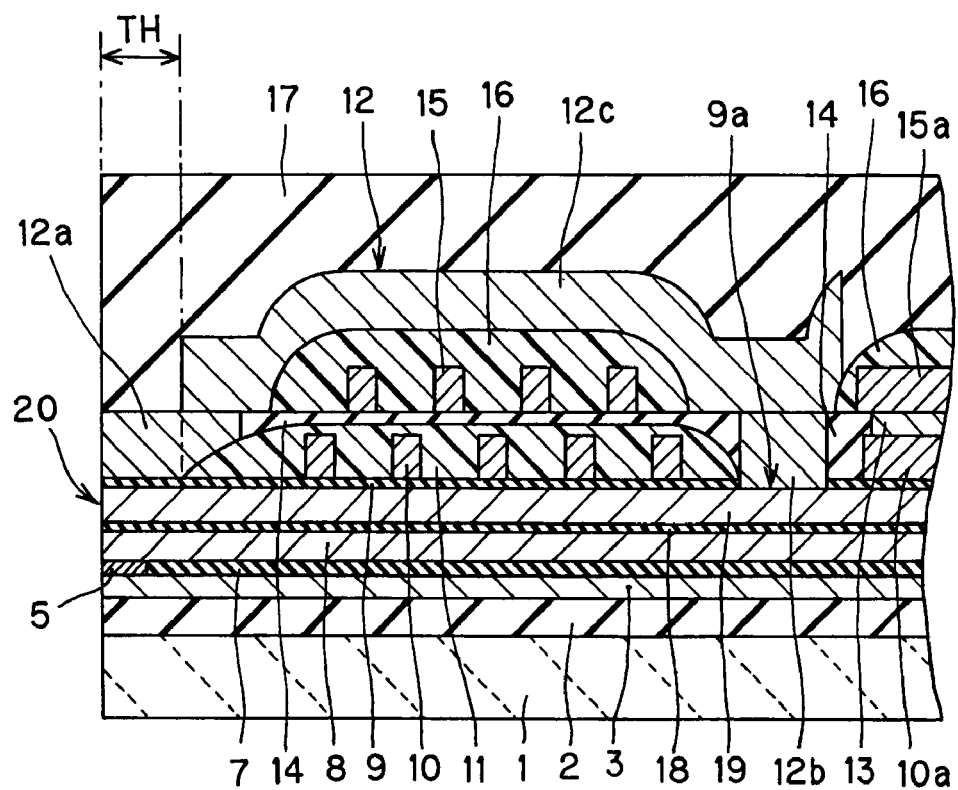
FIG. 2 is illustrative of the construction of the thin-film magnetic head according to one preferable embodiment of the invention; it is a sectional view illustrative of the plane of the thin-film magnetic head in opposition to the medium and a section thereof perpendicular to a substrate.

FIG. 2 is illustrative of the construction of the thin-film magnetic head according to one preferable embodiment of the invention; it is a sectional view illustrative of a section of the thin-film magnetic head perpendicular to the ABS and substrate.

Figure 3:
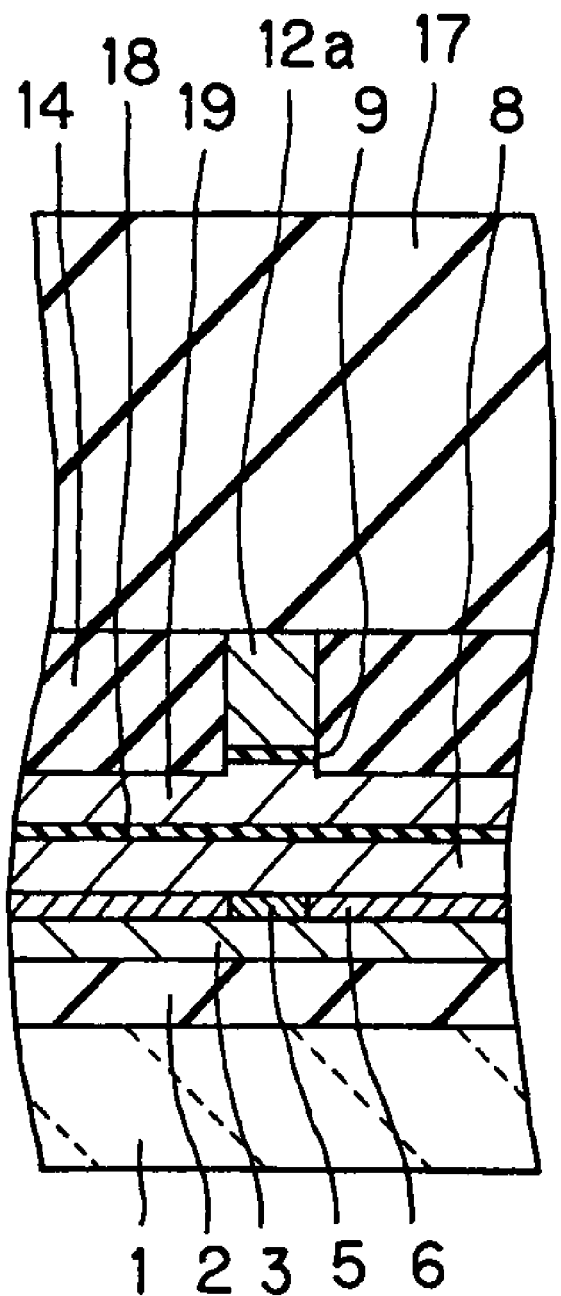
FIG. 3 is illustrative of the construction of the thin-film magnetic head according to one preferable embodiment of the invention; it is a sectional view illustrative of a section of a magnetic pole portion of the thin-film magnetic head parallel with the medium opposite plane.

FIG. 3 is illustrative of the construction of the thin-film magnetic head according to one preferable embodiment of the invention; it is a sectional view illustrative of a section of a magnetic pole portion of the thin-film magnetic head parallel with the ABS in particular.

Figure 4:
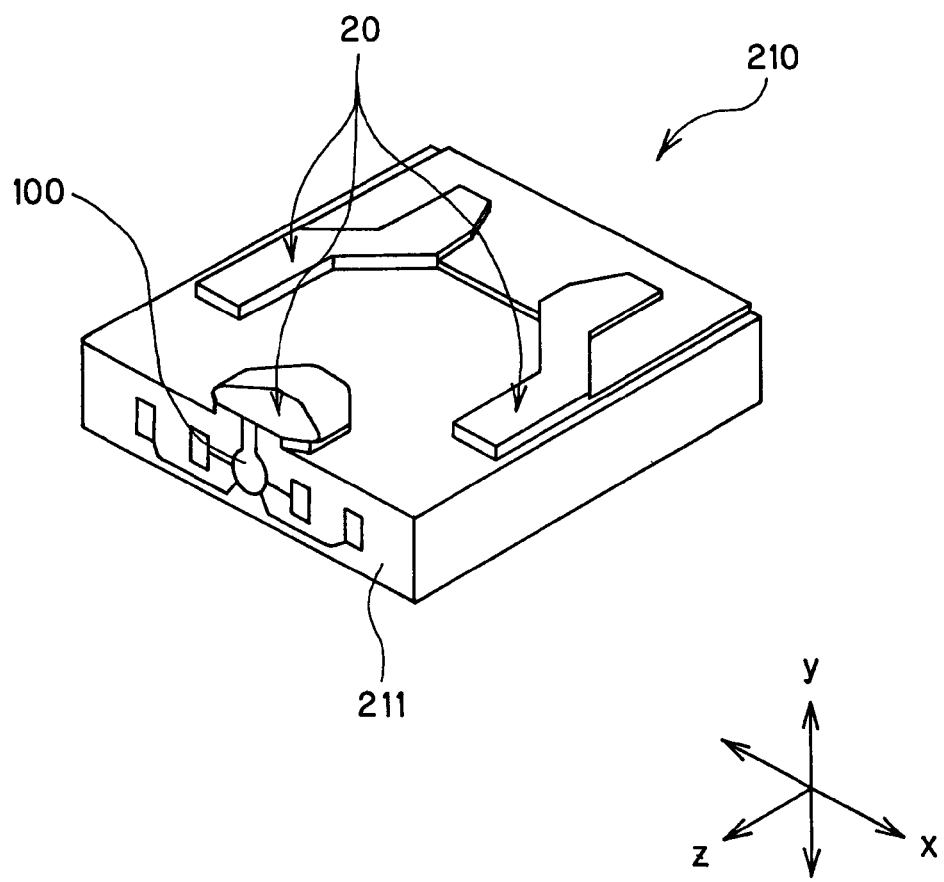
FIG. 4 is a perspective view of a slider built in the head gimbal assembly according to one embodiment of the invention.
Figure 5:
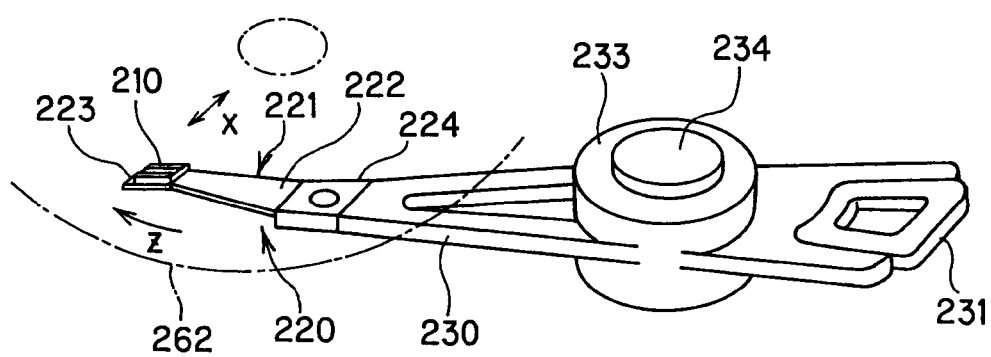
FIG. 5 is a perspective view of a head arm assembly including the head gimbal assembly according to one embodiment of the invention.
Figure 6:
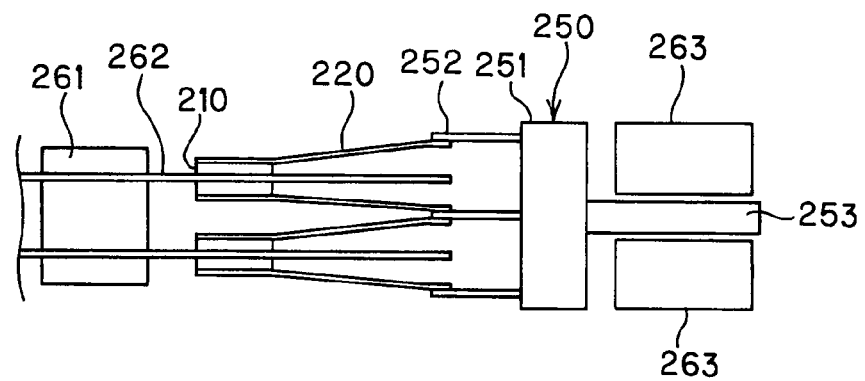
FIG. 6 is illustrative of part of the hard disk system according to one embodiment of the invention.
Figure 7:
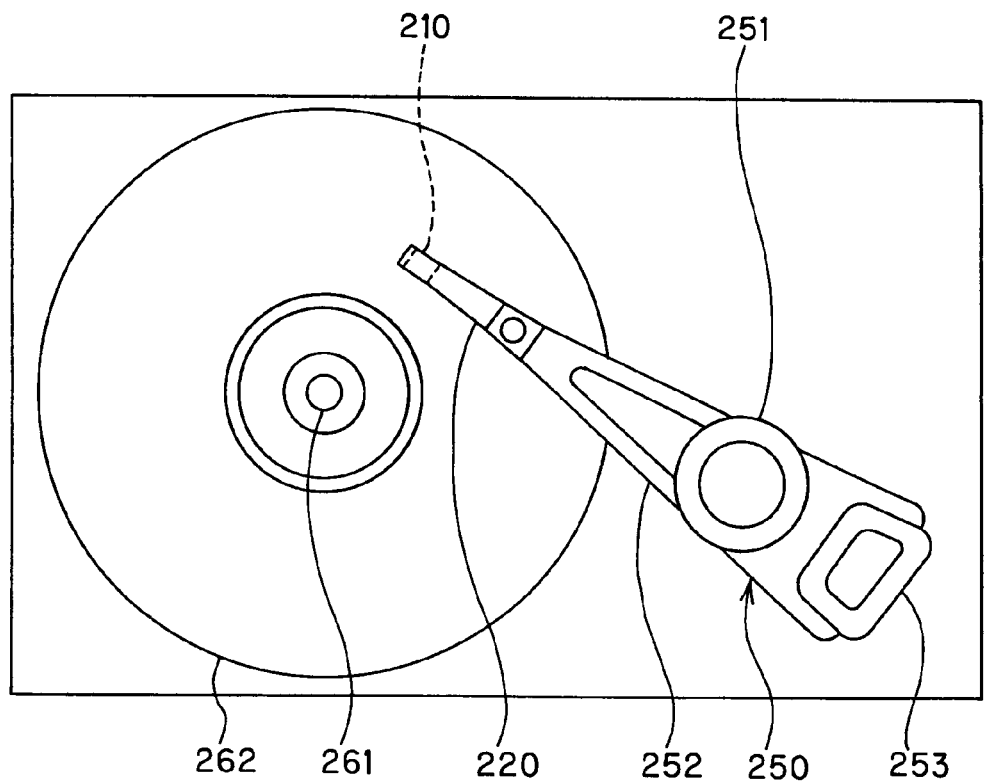
FIG. 7 is a plan view of the hard disk system according to one embodiment of the invention.

FIG. 4 is a perspective view of a slider built in the head gimbal assembly according to one embodiment of the invention; FIG. 5 is a perspective view of a head arm assembly including the head gimbal assembly according to one embodiment of the invention; FIG. 6 is illustrative of part of the hard disk system according to one embodiment of the invention; and FIG. 7 is a plan view of the hard disk system according to one embodiment of the invention.

[Giant Magneto-Resistive Effect Device (CPP-GMR Device) Having a CPP Structure]

The construction of a reproducing head comprising the inventive giant magneto-resistive effect device (CPP-GMR device) having a CPP structure is now explained in details with reference to FIG. 1.

As noted above, FIG. 1 is a sectional view corresponding to a section of the reproducing head parallel with the medium opposite plane.

As shown in FIG. 1, the reproducing head according to the embodiment here comprises a first shield layer 3 and a second shield layer 8 that are located at a given space and opposed vertically on the paper, a giant magneto-resistive effect device 5 (hereinafter referred to as the GMR device 5) located between the first shield layer 3 and the second shield layer 8, an insulating film 4 adapted to cover two sides of the GMR device 5 and a part of the upper surface of the first shield layer 3 along these sides, and two bias magnetic field-applying layers 6 adjacent to the two sides of the GMR device 5 via the insulating layer 4.

In the embodiment here, the first 3 and the second shield layer 8 take a so-called magnetic shield role plus a pair-of-electrodes role. In other words, they have not only a function of shielding magnetism but also function as a pair of electrodes adapted to pass the sense current through the GMR device in a direction intersecting the plane of each of the layers forming the GMR device 5, for instance, in the direction perpendicular to the plane of each of the layers forming the GMR device (stacking direction).

Apart from the first 3 and the second shield layer 8, another pair of electrodes may be additionally provided above and below the GMR device.

The reproducing head of the invention includes the GMR device 5 having a CPP structure-part of the invention.

Referring to the inventive GMR device 5 having a CPP structure in terms of a broad, easy-to-understand concept, it comprises a spacer layer 40, and a fixed magnetization layer 30 and a free layer 50 that are stacked one upon another with the spacer layer 40 held between them, as shown in FIG. 1. And then, the sense current is applied to the GMR device 5 in its stacking direction to enable its function. In short, there is the GMR device 5 having a CPP (current perpendicular to plane) structure involved.

The free layer 50 has its magnetization direction changing dependent on an external magnetic field, viz., a signal magnetic field from a recording medium, while the fixed magnetization layer 30 has its magnetization direction fixed under the action of an antiferromagnetic layer 22. While an embodiment with the antiferromagnetic layer 22 formed on a bottom side (the side of the first shield layer 3) is shown in FIG. 1, it is contemplated that the antiferromagnetic layer 22 may be formed on a top side (the side of the second shield layer 8) to interchange the free layer 50 and the fixed magnetization layer 30 in position.

(Explanation of the Fixed Magnetization Layer 30)

In the invention, the fixed magnetization layer 30 is formed on the antiferromagnetic layer 22 having a pinning action via an underlay layer 21 formed on the first shield layer 3.

In a preferable embodiment of the invention, the fixed magnetization layer 30 has a so-called synthetic pinned layer comprising, in order from the side of the antiferromagnetic layer 22, an outer layer 31, a non-magnetic intermediate layer 32 and an inner layer 33, all stacked together in order.

The outer layer 31, and the inner layer 33 is provided by a ferromagnetic layer made of, for instance, a ferromagnetic material containing Co, and Fe. The outer 31 and the inner layer 32 are antiferromagnetically coupled and fixed such that their magnetization directions are opposite to each other.

The outer 31, and the inner layer 33 is preferably made of, for instance, a $CO_{70}Fe_{30}$ (at %) alloy. The outer layer has a thickness of preferably about 3 to 7 nm, and the inner layer 33 has a thickness of preferably about 3 to 10 nm. The inner layer 33 may also contain a Heusler alloy layer.

For instance, the nonmagnetic intermediate layer 32 is made of a nonmagnetic material containing at least one selected from the group consisting of Ru, Rh, Ir, Re, Cr, Zr and Cu, and has a thickness of, for instance, about 0.35 to 1.0 nm. The nonmagnetic intermediate layer 32 is provided to fix the magnetization of the inner layer 33 and the magnetization of the outer layer 31 in mutually opposite directions. The phrase "magnetization in mutually opposite directions" stands for a broad concept that encompasses just only two such magnetizations in just opposite directions of 180° but also those in different directions of 180°±20° as well.

(Explanation of the Free Layer 50)

The free layer 50 has its magnetization direction changing depending on an external magnetic field, i.e., a signal magnetic field from the recording medium, and is made of a ferromagnetic layer (soft magnetic layer) having a small coercive force. The free layer 50 has a thickness of, for instance, about 2 to 10 nm, and may be in either a single layer form or a multilayer form including a plurality of ferromagnetic layers. The free layer 50 may also contain a Heusler alloy layer.

On such free layer 50, there is a protective layer 26 formed, which comprises a Ta or Ru layer as an example, as shown in FIG. 1. The protective layer 26 has a thickness of about 0.5 to 20 nm.

(Explanation of the Spacer Layer 40)

In the invention, the spacer layer 40 is built up of the first nonmagnetic metal layer 41 and the second nonmagnetic metal layer 43 with a semiconductor oxide layer 42 interposed between them.

More specifically, the spacer layer 40 is built up of a triple-layer structure in which the first nonmagnetic metal layer 41, the semiconductor oxide layer 42 and the second nonmagnetic metal layer 43 are stacked together in order. In the embodiment here, as shown in FIG. 1, the first nonmagnetic metal layer 41 is positioned on the side of the fixed magnetization layer 30 while the second nonmagnetic metal layer 43 is positioned on the side of the free layer 50, as embodied in detail just below.

Semiconductor Oxide Layer 42

The semiconductor oxide layer forming a part of the spacer layer 40 is composed primarily of zinc oxide (ZnO) that further contains at least one selected from among oxides containing a trivalent cation of $Al_2O_3$, $Ga_2O_3$, $In_2O_3$, and $B_2O_3$ (hereinafter called generally "Me2O3") and a tetravalent cation of $TiO_2$ (hereinafter called generally "MeO2"). Usually, that oxide containing trivalent or tetravalent cations is contained in zinc oxide in a substitutional solid solution form.

The oxide containing trivalent or tetravalent cations, for instance, may be incorporated in zinc oxide by pasting or otherwise attaching a trivalent or tetravalent cation-containing oxide to a ZnO target to prepare a given composite target, and then implementing sputtering using that composite target or, alternatively, co-sputtering ZnO and Me in single form and then oxidizing them. Further, a very thin Me film may be inserted into ZnO or onto the interface of ZnO, and they may then be oxidized. Furthermore, ordinary sputtering may be implemented using a target obtained by mixing ZnO with the given oxide to be added and firing the mixture.

Such a thin film is usually heat treated at 200 to 350° C. for 1 to 10 hours after film formation for the purpose of crystallizing the ZnO-Me2O3 or ZnO-MeO2 layer to make its resistance low. The phrase "after film formation" means both after the formation of the semiconductor oxide layer in film form or the formation of the whole device in film form. Ordinarily, that heat treatment is carried out after the formation of the whole film-form device.

Reference is here made to why the oxide containing the trivalent or tetravalent cations, not divalent ones, are incorporated in the zinc oxide.

For instance, upon the dissolution of Me2O3 in ZnO, there is a positively charged area created due to the presence of $Me^{3+}$ at the $Zn^{2+}$ position. To keep electrical neutrality, $O_2$ comes off while leaving behind free electrons with the result that the carrier concentration grows high with a decreasing resistivity. In other words, new carriers cannot possibly be released off without addition of cations having a valence higher than that of Zn.

The content of the trivalent or tetravalent cation-containing oxide incorporated in the zinc oxide (ZnO) in substitutional solid solution form should be such that the semiconductor oxide layer 42 can have lower resistance yet a larger thickness without deterioration of the MR performance.

More specifically, (1) When there is $Al_2O_3$ contained in ZnO, its content should be 0.1 to 15.0 mol %, preferably 0.3 to 15.0 mol %. At less than 0.1 mol %, the advantages of the invention: much less variable device's area resistivity, and much more improved film performance reliability will be less than satisfactory. At greater than 15.0 mol %, on the other hand, there will be inconvenience: difficulty in keeping high MR performance.

(2) When there is $Ga_2O_3$ contained in ZnO, its content should be 0.1 to 20.0 mol %, preferably 0.3 to 20.0 mol %. At less than 0.1 mol %, the advantages of the invention: much less variable device's area resistivity, and much more improved film performance reliability will be less than satisfactory.

At greater than 20.0 mol %, on the other hand, there will be inconvenience: difficulty in keeping high MR performance.

(3) When there is $B_2O_3$ contained in ZnO, its content should be 0.1 to 15.0 mol %, preferably 0.3 to 15.0 mol %. At less than 0.1 mol %, the advantages of the invention: much less variable device's area resistivity, and much more improved film performance reliability will be less than satisfactory. At greater than 15.0 mol %, on the other hand, there will be inconvenience: difficulty in keeping high MR performance.

(4) When there is $In_2O_3$ contained in ZnO, its content should be 0.1 to 15.0 mol %, preferably 0.3 to 15.0 mol %. At less than 0.1 mol %, the advantages of the invention: much less variable device's area resistivity, and much more improved film performance reliability will be less than satisfactory. At greater than 15.0 mol %, on the other hand, there will be inconvenience: difficulty in keeping high MR performance.

(5) When there is $TiO_2$ contained in ZnO, its content should be 0.1 to 20.0 mol %, preferably 0.3 to 20.0 mol %. At less than 0.1 mol %, the advantages of the invention: much less variable device's area resistivity, and much more improved film performance reliability will be less than satisfactory. At greater than 20.0 mol %, on the other hand, there will be inconvenience: difficulty in keeping high MR performance.

The same goes to when two or more of $Al_2O_3$, $Ga_2O_3$, $In_2O_3$, $B_2O_3$ and $TiO_2$ are used, too; their contents should be such that the semiconductor oxide layer 42 can have lower resistance yet a larger thickness without deterioration of the MR performance.

Such semiconductor oxide layer 42 should have a thickness of 2.0 to 4.0 nm, preferably 2.2 to 4.0 nm, and more preferably 2.5 to 4.0 nm. As that value is less than 2.0 nm, there is a tendency of giving rise to inconvenience: large variations of the device performances inclusive of the device's area resistivity AR. As that value exceeds 4.0 nm, on the other hand, there is a tendency of giving rise to inconvenience: deterioration of the MR performance due to the scattering of spins. There is another inconvenience of departing from the resistance area found for CPP-GMR devices.

First Nonmagnetic Metal Layer 41, and Second Nonmagnetic Metal Layer 43

For the nonmagnetic metal material used for the first 41, and the second nonmagnetic metal layer 43, for instance, use may be made of one selected from among Cu, Au, Ag, AuCu, CuZn, Cr, Ru, and Rh, although Cu, Au, and Ag is most preferred.

The first 41, and the second nonmagnetic metal layer 43 has a thickness of about 0.3 to 2.0 nm.

The electroconductivity of the spacer layer 40 having such construction as described above is desirously in the range of 100 to 1,450 (S/cm), preferably 165 to 630 (S/cm). The electroconductivity of the spacer layer 40 here is defined as the reciprocal of the resistivity ($\Omega \cdot cm$) of the spacer layer 40. The spacer layer 40 is constructed of a triple-layer structure in which the first nonmagnetic metal 41/semiconductor oxide layer 42/second nonmagnetic metal layer 43 are stacked together in order.

(Explanation of the Antiferromagnetic Layer 22)

The antiferromagnetic layer 22 works such that by way of exchange coupling with the fixed magnetization layer 30 as described above, the magnetization direction of the fixed magnetization layer 30 is fixed.

For instance, the antiferromagnetic layer 22 is made of an antiferromagnetic material containing at least one element M' selected from the group of Pt, Ru, Rh, Pd, Ni, Cu, Ir, Cr and Fe, and Mn. The content of Mn is preferably 35 to 95 at %. The antiferromagnetic material is broken down into two types: (1) a non-heat treatment type antiferromagnetic material that shows anti-ferromagnetism even in the absence of heat treatment to induce an exchange coupling magnetic field between it and a ferromagnetic material, and (2) a heat treatment type antiferromagnetic material that comes to show anti-ferromagnetism by heat treatment. In the invention, both types (1) and (2) may be used without restriction. For instance, the non-heat treatment type antiferromagnetic material is exemplified by RuRhMn, FeMn, and IrMn, and the heat treatment type antiferromagnetic material is exemplified by PtMn, NiMn, and PtRhMn.

The antiferromagnetic layer 22 has a thickness of about 5 to 30 nm.

It is here noted that for the layer for fixing the magnetization direction of the fixed magnetization layer 30, it is acceptable to use a hard magnetic layer comprising a hard magnetic material such as CoPt in place of the aforesaid antiferromagnetic layer.

The underlay layer 21 formed below the anti-ferromagnetic layer 22 is provided to improve the crystallization and orientation of each of the layers stacked on it in general, and the exchange coupling of the antiferromagnetic layer 22 and the fixed magnetization layer 30 in particular. For such underlay layer 21, for instance, a multilayer structure of Ta and NiCr layers is used. The underlay layer 21 has a thickness of about 2 to 6 nm as an example.

In the invention, the area resistivity, AR, of the magneto-resistive effect device 5 (CPP-GMR device 5) is in the range of 0.1 to $0.3 \Omega \cdot \mu m^2$, preferably 0.12 to $0.3 \Omega \cdot \mu m^2$, and more preferably 0.14 to $0.28\ \Omega \cdot \mu m^2$. Any deviation from the range of 0.1 to $0.3 \Omega \Omega \mu m^2$ would make it difficult to obtain large MR ratios while reducing noise and holding back the influences of spin torque.

The device (CPP-GMR device) to be measured for its area resistivity is a multilayer arrangement comprising the underlay layer 21, antiferromagnetic layer 22, fixed magnetization layer 30, spacer layer 40, free layer 50 and protective layer 26, as shown in FIG. 1.

Referring now to the insulating layer 4 shown in FIG. 1, it is made of an alumina material as an example. For the bias magnetic field-applying layer 6, for instance, use is made of a hard magnetic layer (hard magnet) or a multilayer arrangement of a ferromagnetic layer and an antiferromagnetic layer, specifically, CoPt, and CoCrPt.

The giant magneto-resistive effect device (CPP-GMR device) of the CPP structure in the embodiment of the invention as described above may be formed by means of vacuum film-formation techniques such as sputtering. If required, heat treatment may be applied after film-formation.

(Explanation of the Whole Construction of the Thin-Film Magnetic Head)

The whole construction of the thin-film magnetic head comprising the aforesaid magneto-resistive effect device is now explained. As already mentioned, FIGS. 2 and 3 are illustrative of the construction of the thin-film magnetic head according to one preferred embodiment of the invention; FIG. 2 is illustrative of a section of the thin-film magnetic head perpendicular to the ABS and a substrate, and FIG. 3 is illustrative of a section of a magnetic pole portion of the thin-film magnetic head parallel with the ABS.

The whole structure of the thin-film magnetic head will be better understood when consideration is given to its fabrication process steps; the whole structure of the thin-film magnetic head is now explained with reference to its fabrication process steps.

First of all, an insulating layer 2 comprising an insulating material such as alumina ($Al_2O_3$) or silicon dioxide ($SiO_2$) is formed by sputtering or like techniques on a substrate 1 comprising a ceramic material such as AlTiC ($Al_2O_3.TiC$). That insulating layer has a thickness of about 0.5 to 20 μm as an example.

Then, a lower shield layer 3 comprising a magnetic material and adapted for a reproducing head is formed on that insulating layer 2. The shield layer 3 has a thickness of about 0.1 to 5 μm as an example. The magnetic material used for such lower shield layer 3, for instance, includes FeAlSi, NiFe, CoFe, CoFeNi, FeN, FeZrN, FeTaN, CoZrNb, and CoZrTa. The lower shield layer 3 is formed by sputtering, plating or like other techniques.

Then, a reproducing CPP-GMR device 5 is formed on the lower shield layer 3.

Although not shown, an insulating film is then formed in such a way as to cover two sides of the MR device and the upper surface of the first shield layer 3. The insulating film is formed of an insulating material such as alumina.

Then, two bias magnetic field-applying layers 6 are formed in such a way as to be adjacent to the two sides of the MR device 5 via the insulating layer. Then, an insulating film 7 is formed in such a way as to be located around the CPP-GMR device 5 and bias magnetic field-applying layers 6. The insulating film 7 is formed of an insulating material such as alumina.

Then, a second shield layer 8 for the reproducing head, comprising a magnetic material, is formed on the bias magnetic field-applying layers 6 and insulating layer 7. The second shield layer 8, for instance, is formed by means of plating or sputtering.

Then, a separation layer 18 comprising an insulating material such as alumina is formed by sputtering or the like on the upper shield layer 8. Then, a lower magnetic pole layer 19, comprising a magnetic material and adapted for a recording head, is formed by plating, sputtering or the like on the separation layer 18. The magnetic material used for the second shield layer 8, and the lower magnetic pole layer 19, for instance, includes a soft magnetic material such as NiFe, CoFe, CoFeNi, and FeN. It is here noted that instead of the multilayer arrangement of the second shield layer 8, separation layer 18 and lower magnetic pole layer 19, it is acceptable to configure the second shield layer in such a way as to work also as a lower electrode layer.

Then, a recording gap layer 9 comprising a non-magnetic material such as alumina is formed by sputtering or the like on the lower magnetic pole layer 19. That recording gap layer has a thickness of about 50 to 300 nm.

For the formation of a magnetic path, the recording gap layer 9 is then partially etched at the center of the thin-film coil to be described later to form a contact hole 9a.

Then, a first layer portion 10 of the thin-film coil, typically comprising copper (Cu), is formed on the recording gap layer 9 at a thickness of typically 2 to 3 μm. In FIG. 2, note that reference numeral 10a stands for a connector portion of the first layer portion 10, which is to be connected to a second layer portion 15 of the thin-film coil to be described later. The first layer portion 10 is wound around the contact hole 9a.

Then, an insulating layer 11 comprising a photo-resist or other organic material having fluidity upon heating is formed in such a given pattern as to cover the first layer portion 10 of the thin-film coil and the surrounding recording gap layer 9.

Then, the insulating layer 11 is heat treated at a given temperature to make its surface flat. By this heat treatment, each of the edge portions of the outer and inner peripheries of the insulating layer 11 is configured into a rounded slant.

Then, in an area of the insulating layer 11 from a slant portion on the medium opposite plane 20 (to be described later) side to the medium opposite plane 20 side, a track width-setting layer 12a of an upper magnetic pole layer 12 is formed on the recording gap layer 9 and insulating layer 11, using the magnetic material for the recording head. The upper magnetic pole layer 12 is made up of that track width-setting layer 12a, and a coupler portion layer 12b and a yoke portion layer 12c to be described later.

The track width-setting layer 12a is formed on the recording gap layer 9, including an end portion that provides a magnetic pole portion of the upper magnetic pole layer 12 and a connector portion that is formed on the slant portion of the insulating layer 11 on the medium opposite plane 20 side and connected to the yoke portion layer 12c. The width of that end portion is set equal to the recording track width, and the width of the connector portion is greater than the width of the end portion.

Simultaneously with the formation of the track width-setting layer 12a, the coupler portion 12b comprising a magnetic material is formed on the contact hole 9a and a connector layer 13 comprising a magnetic material is formed on the connector portion 10a. The coupler portion layer 12b forms a portion of the upper magnetic pole layer 12, which is to be magnetically connected to the upper shield layer 8.

Then, magnetic pole trimming is carried out. That is, in an area around the track width-setting layer 12a, the track width-setting layer 12a is used as a mask to etch at least a part of the recording gap layer 9 and the magnetic pole portion of the upper shield layer 8 on the recording gap layer 9 side, whereby, as shown in FIG. 3, there is a trim structure formed, in which at least a part of the magnetic pole portion of the upper magnetic pole layer 12, the recording gap layer 9 and the magnetic pole portion of the upper shield layer 8 has a uniform width. This trim structure makes sure prevention of an effective increase in the track width due to the spread of a magnetic flux near the recording gap layer 9.

Then, an insulating layer 14 comprising alumina or other inorganic insulating material is formed around the whole at a thickness of typically 3 to 4 μm.

Then, that insulating layer 14 is polished by chemo-mechanical polishing or the like as far as the surfaces of the track width-setting layer 12a, coupler portion layer 12b and connector layer 13 for flattening.

Then, the second layer portion 15 of the thin-film coil typically comprising copper (Cu) is formed on the flattened insulating layer 14 at a thickness of typically 2 to 3 am. In FIG. 2, note that reference numeral 15a is indicative of a connector portion of the second layer portion 15, which is to be connected to the connector portion 10a of the first layer portion 10 of the thin-film coil by way of the connector layer 13. The second layer portion 15 is wound around the coupler portion layer 12b.

Then, an insulating layer 16 comprising a photo-resist or other organic material having fluidity upon heating is formed in such a given pattern as to cover the second layer portion 15 of the thin-film coil and the surrounding insulating layer 14.

Then, the insulating layer 16 is heat treated at a given temperature to make its surface flat. By this heat treatment, each of the edge portions of the outer and inner peripheries of the insulating layer 16 is configured into a rounded slant.

Then, the magnetic material for the recording head such as permalloy is used to form the yoke portion layer 12c forming the yoke portion of the upper magnetic layer 12 on the track width-setting layer 12a, insulating layers 14, 16 and coupler portion layer 12b. An end of the yoke layer portion 12c on the medium opposite plane 20 side is spaced away from the medium opposite plane 20, and the yoke portion layer 12c is connected to the lower magnetic pole layer 19 by way of the coupler portion layer 12b.

Then, an overcoat layer 17 typically comprising alumina is formed in such a way as to cover the whole. Finally, a slider including the aforesaid respective layers is machined to form the medium opposite plane 20 of the thin-film head including the recording head and reproducing head in the form of a complete thin-film magnetic head.

The thus fabricated thin-film magnetic head comprises the medium opposite plane 20 in opposition to the recording medium, the aforesaid reproducing head, and the recording head (induction type of magnetic device).

The magnetic head comprises the magnetic lower and upper magnetic pole layers 19 and 12 that include mutually opposite magnetic pole portions on the medium opposite plane 20 side and are magnetically coupled to each other, the recording gap layer 9 located between the magnetic pole portion of the lower magnetic pole layer 19 and the magnetic pole portion of the upper magnetic pole layer 12, and the thin films 10, 15 at least a part of which is located between the lower 19 and the upper magnetic pole layer 12 while insulated from them.

As shown in FIG. 2, such a thin-film magnetic head has a throat height (indicated by TH in the drawing) that is defined by a length from the medium opposite plane 20 up to the end of the insulating layer 11 on the medium opposite plane side. In other words, the "throat height" means a length (height) from the medium opposite plane 20 to a position at which the two magnetic pole layers start being spaced away.

(Explanation of how the Thin-Film Magnetic Head Works)

How the thin-film magnetic head according to the embodiment here works is now explained. The thin-film magnetic head records information in the recording medium by the recording head, and plays back the information recorded in the recording medium by the reproducing head.

At the reproducing head, the direction of a bias magnetic field applied by the bias magnetic field-applying layers 6 is orthogonal to the direction perpendicular to the medium opposite plane 20. At the CPP-GMR device 5 with no signal magnetic field applied yet, the magnetization direction of the free layer 50 lies in the direction of the bias magnetic field, and the magnetization direction of the fixed magnetization layer 30 is fixed in the direction perpendicular to the medium opposite plane 20.

At the CPP-GMR device 5, there is a change in the magnetization direction of the free layer 50 depending on a signal magnetic field from the recording medium, which in turn causes a change in the relative angle between the magnetization direction of the free layer 50 and the magnetization direction of the fixed magnetization layer 30, with the result that there is a change in the resistance value of the CPP-GMR device 5. The resistance value of the CPP-GMR device 5 may be found from a potential difference between the first and second shield layers, i.e., the two electrode layers 3 and 8 at the time when the sense current is passed through the MR device. It is thus possible for the reproducing head to play back the information recorded in the recording medium.

(Explanation of the Head Gimbal Assembly and the Hard Disk System)

The head gimbal assembly and the hard disk system according to the embodiment here are now explained.

A slider 210 included in the head gimbal assembly is first explained with reference to FIG. 4. In the hard disk system, the slider 210 is located in such a way as to face a hard disk that is a rotationally driven disk-form recording medium. This slider 210 primarily comprises a substrate 211 built up of a substrate 1 and an overcoat 24 depicted in FIG. 2.

The substrate 211 is in a generally hexahedral shape. Of the six surfaces of the substrate 211, one surface is in opposition to the hard disk. On that one surface there is a medium opposite plane 20 formed.

As the hard disk rotates in the z-direction in FIG. 4, it causes an air flow passing between the hard disk and the slider 210 to induce lift relative to the slider 210 in the downward y-direction in FIG. 4. This lift in turn causes the slider 210 to levitate over the surface of the hard disk. Note here that the x-direction in FIG. 4 traverses tracks on the hard disk.

Near the end of the slider 210 on an air exit side (the left lower end in FIG. 4), there is the thin-film magnetic head 100 formed according to the invention.

A head gimbal assembly 220 according to this embodiment is now explained with reference to FIG. 5. The head gimbal assembly 220 comprises a slider 210 and a suspension 221 adapted to resiliently support that slider 210. The suspension 221 comprises a leaf spring-form load beam 222 formed typically of stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction x of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

FIG. 5 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

One example of the head stack assembly and the hard disk system according to the instant embodiment are now explained with reference to FIGS. 6 and 7.

FIG. 6 is illustrative of part of the hard disk system, and FIG. 7 is a plan view of the hard disk system.

A head stack assembly 250 comprises a carriage 251 having a plurality of arms 252. The plurality of arms 252 are provided with a plurality of the head gimbal assemblies 220 such that they line up vertically at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the magnetic disk system here have pretty much the same action as the thin-film magnetic head according to the foregoing embodiment.

While the embodiment here has been described with reference to the thin-film magnetic head of the structure wherein the reproducing head is located on the substrate side and the recording head is stacked on the reproducing head, it is contemplated that that order of stacking could be reversed. When the thin-film magnetic head here is used as a read-only head, the recording head could be removed from it.

It is also contemplated that part of the invention may be applied not only to magnetic heads but also as a so-called thin-film magnetic field sensor adapted to detect a magnetic field.

EXAMPLES

The CPP-GMR device as described above is now explained in more details with reference to the following specific experimental examples.

Experimental Example I

An inventive CPP-GMR device sample having such multilayer construction as set out in Table 1 and a reference CPP-GMR device sample were formed by sputtering and readied up for experimentation. Note here that in the actual preparation of specific samples, various such samples as shown in Table 2 were prepared while there were changes in the thickness of the semiconductor oxide layer forming a part of the spacer layer in Table 1 and the types of Me2O3 and MeO2 contained in the semiconductor oxide layer (composed primarily of ZnO).

In the reference examples, the semiconductor oxide layer forming a part of the spacer layer in Table 1 consist of ZnO alone, free from $Me_2O_3$ and $MeO_2$.

Each sample was prepared by forming the respective layers forming the CPP-GMR device into a multilayer structure, and then heat treating it at 270° C. for 3 hours. The heat treatment is mainly to crystallize the semiconductor oxide layer thereby making its resistance low. Experimentation had taught that the preferable range for the heat treatment is 200 to 350%.

The semiconductor oxide layers ((ZnO), (ZnO+$Me_2O_3$), (ZnO+$MeO_2$)) forming a part of the spacer layer were formed as follows.

(i) The Case where the Semiconductor Oxide Layer is Composed of ZnO Alone as in the Reference Samples The ZnO layer was formed by sputtering using a ZnO target, because Zn could not be formed of its own right by sputtering.

After the respective layers were formed into the device, it was heat treated at 270° C. for 3 hours to crystallize the ZnO layer thereby making its resistance low.

The multilayer layer constituting the basics of such a device was processed into a columnar form that was in turn protected on the sides with an insulator to prepare a CPP-GMR device.

(ii) The Case where the Semiconductor Oxide Layer was Set Up in (ZnO+$Me_2O_3$) Form A $Me_2O_3$ chip pasted or otherwise attached to a ZnO target was formed by sputtering. In an added state set out in Table 2, the resulting film was supposed to contain 4 mol % of $Me_2O_3$.

After the respective layers were formed into the device, it was heat treated at 270° C. for 3 hours to crystallize the (ZnO+$Me_2O_3$) layer thereby making its resistance low.

The multilayer layer constituting the basics of such a device was processed into a columnar form that was in turn protected on the sides with an insulator to prepare a CPP-GMR device.

(iii) The Case where the Semiconductor Oxide Layer was Set Up in (ZnO+$MeO_2$) Form A $MeO_2$ chip pasted or otherwise attached to a ZnO target was formed by sputtering. In an added state set out in Table 2, the resulting film was supposed to contain 4 mol % of $MeO_2$.

After the respective layers were formed into the device, it was heat treated at 270° C. for 3 hours to crystallize the (ZnO+$MeO_2$) layer thereby making its resistance low.

The multilayer layer constituting the basics of such a device was processed into a columnar form that was in turn protected on the sides with an insulator to prepare a CPP-GMR device.

Each of the CPP-GMR device samples prepared as described above assumes on an oblong form having a width of 0.06 μm (the length in the track width direction), and a length of 0.10 μm (the length in the direction (MR height direction) perpendicular to the ABS in the depth direction), as viewed from above. This configuration is almost the same as that of a GMR device actually used for a reproducing head. The results of experimentation had substantially the same tendencies irrespective of device shape.

Each of such CPP-GMR device samples was measured and estimated according to the following procedures about (1) the MR ratio, (2) the area resistivity AR ($\Omega \cdot \mu m^2$) of the device, (3) the electroconductivity (S/cm) of the spacer layer, and (4) the "ARσ normalized value" wherein the standard deviation σ(%) for AR was normalized.

(1) MR Ratio

The MR ratio was measured by an ordinary dc four-terminal method. The MR ratio is represented by ΔR/R where ΔR is indicative of the amount of resistance change, and R is indicative of a resistance value. The figure, because of being small, is indicated in terms of percentage.

Note here that the MR ratio was found as an average of 100 samples.

(2) Area Resistivity AR ($\Omega \cdot \mu M^2$) of the Device

The area resistivity was measured by a dc four-terminal method.

(3) Electroconductivity (S/cm) of the Spacer Layer

First, the resistivity ($\Omega \cdot cm$) of the spacer layer 40 was found by subtracting from the area resistivity of a CPP-GMR device sample the area resistivity other than that of the spacer layer 40. Then, the resultant value is divided by the thickness of the spacer layer 40 to find the resistivity ($\Omega \cdot cm$) of the spacer layer 40. The electroconductivity (S/cm) of the spacer layer 40 is worked out as the reciprocal of the resistivity ($\Omega \cdot cm$) of the spacer layer 40.

(4) The "ARσ Normalized Value" Wherein the Standard Deviation σ(%) for AR was Normalized.

First of all, the area resistivity AR of each device was measured, and the variation of the area resistivity AR was figured out as the standard deviation σ(%). There were one hundred samples involved. The ratio of the standard deviation (%) for AR of each sample to the reference value given by the standard deviation σ(%) of sample No. 3 in Table 2 was found as the "ARσ normalized value".

The smaller the value of the "ARσ normalized value", the smaller the variation of the area resistivity AR becomes.

The results are tabulated in Table 2 below.

TABLE 1

| Multilayer structure | | Layer material | Thickness (nm) |
|---|---|---|---|
| Protective layer | | Ru | 2.0 |
| Free layer | | Co70Fe30 | 4.0 |
| Spacer layer | 2nd Nonmagnetic metal layer | Cu | 0.7 |
| | Semiconductor oxide layer | (ZnO + Me$_2$O$_3$) or (ZnO + MeO$_2$) | T1 |
| | 1st Nonmagnetic metal layer | Cu | 0.7 |
| Fixed magnetization layer | Inner layer | Co70Fe30 | 3.5 |
| | Nonmagnetic intermediate layer | Ru | 0.7 |
| | Outer layer | Co70Fe30 | 3.0 |
| Antiferromagnetic layer | | IrMn | 5.0 |
| Underlay layer | | NiCr | 4.0 |

TABLE 2

| Sample No. | Semiconductor oxide layer | | | MR ratio (%) | Area resistivity AR of the device (Ω·μm$^2$) | Electroconductivity of the spacer layer (S/cm) | AR σ Normalized value |
|---|---|---|---|---|---|---|---|
| | Type of the additive | Amount of the additive (mol %) | Thickness T1 (nm) | | | | |
| Ref. 1 | — | — | 0.8 | 2.1 | 0.07 | 863 | 0.73 |
| Ref. 2 | — | — | 1.2 | 8.5 | 0.12 | 344 | 0.75 |
| Ref. 3 | — | — | 1.4 | 12.1 | 0.17 | 227 | 1.00 |
| Ref. 4 | — | — | 1.6 | 13.3 | 0.24 | 157 | 1.56 |
| Ref. 5 | — | — | 2.0 | 12.6 | 0.59 | 62 | 2.95 |
| Ref. 6 | — | — | 2.4 | — | — | — | — |
| Ref. 7 | — | — | 2.8 | — | — | — | — |
| Ref. 8 | — | — | 3.2 | — | — | — | — |
| A-1 | Al$_2$O$_3$ | 4.0 | 0.8 | 1.0 | 0.07 | 800 | 0.32 |
| A-2 | Al$_2$O$_3$ | 4.0 | 1.2 | 1.2 | 0.07 | 946 | 0.36 |
| A-3 | Al$_2$O$_3$ | 4.0 | 1.6 | 1.7 | 0.08 | 822 | 0.35 |
| A-4 | Al$_2$O$_3$ | 4.0 | 2.0 | 3.0 | 0.08 | 1115 | 0.36 |
| A-5 | Al$_2$O$_3$ | 4.0 | 2.4 | 8.5 | 0.08 | 1070 | 0.40 |
| A-6 | Al$_2$O$_3$ | 4.0 | 2.8 | 9.5 | 0.08 | 1091 | 0.35 |
| A-7 | Al$_2$O$_3$ | 4.0 | 3.2 | 13.3 | 0.11 | 724 | 0.37 |
| A-8 | Al$_2$O$_3$ | 4.0 | 3.6 | 14.1 | 0.17 | 415 | 0.41 |
| A-9 | Al$_2$O$_3$ | 4.0 | 4.0 | 13.7 | 0.30 | 215 | 0.95 |
| G-1 | Ga$_2$O$_3$ | 4.0 | 0.8 | 1.0 | 0.07 | 830 | 0.30 |
| G-2 | Ga$_2$O$_3$ | 4.0 | 1.2 | 1.5 | 0.07 | 912 | 0.32 |
| G-3 | Ga$_2$O$_3$ | 4.0 | 1.6 | 1.3 | 0.08 | 822 | 0.30 |
| G-4 | Ga$_2$O$_3$ | 4.0 | 2.0 | 4.2 | 0.09 | 819 | 0.29 |
| G-5 | Ga$_2$O$_3$ | 4.0 | 2.4 | 13.6 | 0.11 | 598 | 0.29 |
| G-6 | Ga$_2$O$_3$ | 4.0 | 2.8 | 15.2 | 0.15 | 394 | 0.33 |
| G-7 | Ga$_2$O$_3$ | 4.0 | 3.2 | 15.0 | 0.23 | 245 | 0.35 |
| G-8 | Ga$_2$O$_3$ | 4.0 | 3.6 | 14.8 | 0.36 | 158 | 0.48 |
| G-9 | Ga$_2$O$_3$ | 4.0 | 4.0 | 14.4 | 0.59 | 99 | 1.16 |
| B-1 | B$_2$O$_3$ | 4.0 | 0.8 | 0.5 | 0.07 | 772 | 0.48 |
| B-2 | B$_2$O$_3$ | 4.0 | 1.2 | 1.0 | 0.07 | 946 | 0.53 |
| B-3 | B$_2$O$_3$ | 4.0 | 1.6 | 5.5 | 0.08 | 822 | 0.51 |
| B-4 | B$_2$O$_3$ | 4.0 | 2.0 | 11.2 | 0.09 | 747 | 0.54 |
| B-5 | B$_2$O$_3$ | 4.0 | 2.4 | 13.6 | 0.17 | 305 | 0.52 |
| B-6 | B$_2$O$_3$ | 4.0 | 2.8 | 12.6 | 0.27 | 184 | 0.71 |
| B-7 | B$_2$O$_3$ | 4.0 | 3.2 | 12.5 | 0.58 | 86 | 1.39 |
| B-8 | B$_2$O$_3$ | 4.0 | 3.6 | — | — | — | — |
| B-9 | B$_2$O$_3$ | 4.0 | 4.0 | — | — | — | — |
| I-1 | In$_2$O$_3$ | 4.0 | 0.8 | 1.2 | 0.07 | 863 | 0.44 |
| I-2 | In$_2$O$_3$ | 4.0 | 1.2 | 1.0 | 0.07 | 946 | 0.56 |
| I-3 | In$_2$O$_3$ | 4.0 | 1.6 | 4.3 | 0.08 | 779 | 0.48 |
| I-4 | In$_2$O$_3$ | 4.0 | 2.0 | 12.4 | 0.14 | 356 | 0.50 |
| I-5 | In$_2$O$_3$ | 4.0 | 2.4 | 13.4 | 0.25 | 187 | 0.74 |
| I-6 | In$_2$O$_3$ | 4.0 | 2.8 | 13.1 | 0.52 | 89 | 1.19 |
| I-7 | In$_2$O$_3$ | 4.0 | 3.2 | — | — | — | — |
| I-8 | In$_2$O$_3$ | 4.0 | 3.6 | — | — | — | — |
| I-9 | In$_2$O$_3$ | 4.0 | 4.0 | — | — | — | — |
| T-1 | TiO$_2$ | 4.0 | 0.8 | 1.2 | 0.07 | 863 | 0.56 |
| T-2 | TiO$_2$ | 4.0 | 1.2 | 4.7 | 0.08 | 800 | 0.45 |
| T-3 | TiO$_2$ | 4.0 | 1.6 | 9.9 | 0.10 | 541 | 0.54 |
| T-4 | TiO$_2$ | 4.0 | 2.0 | 15.2 | 0.19 | 231 | 0.56 |
| T-5 | TiO$_2$ | 4.0 | 2.4 | 15.1 | 0.29 | 154 | 0.84 |
| T-6 | TiO$_2$ | 4.0 | 2.8 | 14.2 | 0.52 | 88 | 1.15 |

TABLE 2-continued

| Sample No. | Semiconductor oxide layer | | Thickness T1 (nm) | MR ratio (%) | Area resistivity AR of the device (Ω·μm²) | Electroconductivity of the spacer layer (S/cm) | AR σ Normalized value |
|---|---|---|---|---|---|---|---|
| | Type of the additive | Amount of the additive (mol %) | | | | | |
| T-7 | TiO₂ | 4.0 | 3.2 | — | — | — | — |
| T-8 | TiO₂ | 4.0 | 3.6 | — | — | — | — |
| T-9 | TiO₂ | 4.0 | 4.0 | — | — | — | — |

The blanks with no data in Table 2 indicate that the area resistivity of the device grows way too large for potential practical use.

From the results set out in Table 2, the advantages of the invention would be undisputed.

That is to say, by using zinc oxide as the main ingredient of the semiconductor oxide layer forming a part of the spacer layer and containing one selected from among oxides containing a trivalent cation of $Al_2O_3$, $Ga_2O_3$, $In_2O_3$, and $B_2O_3$ and an oxide containing a tetravalent cation of $TiO_2$ in the zinc oxide in an amount of, for instance, 4 moles, the semiconductor oxide layer forming a part of the spacer layer can be made thicker while keeping the area resistivity of the device lower as desired. It is thus possible to achieve the advantages of the invention: much higher MR performance, much less variable device's area resistivity, and much more improved film performance reliability.

More specifically, comparisons of data with the area resistivity AR of the device set at the design target of around $0.17 \Omega \cdot \mu m^2$ reveal that the ARσ normalized value is in the range of 0.3 to 0.6 in sharp contrast to the reference ARσ normalized value=1.00, showing that there are the advantages of the invention achievable: much less variable device's area resistivity, and much more improved film performance reliability.

Experimental Example II

As regards the makeup of the semiconductor oxide layer forming a part of the spacer layer in general and the zinc oxide that was its main ingredient in particular, there was experimentation carried out to learn the influences of the $Al_2O_3$ content on the advantages of the invention. Note here that the area resistivity ($\Omega \cdot \mu m^2$) of the device was set at around 0.17 ($\Omega \cdot \mu m^2$) at which, as a result of the aforesaid Experimental Example I, there were good MR ratios obtained.

The results are tabulated in Table 3 given below.

TABLE 3

($Al_2O_3$ Content)

| Sample No. | Semiconductor oxide layer | | Thickness T1 (nm) | MR ratio (%) | Area resistivity AR of the device (Ω·μm²) | Electroconductivity of the spacer layer (S/cm) | AR σ Normalized value |
|---|---|---|---|---|---|---|---|
| | Type of the additive | Amount of the additive (mol %) | | | | | |
| Ref. 3 | — | — | 1.4 | 12.1 | 0.17 | 227 | 1.00 |
| A-10 | Al₂O₃ | 0.1 | 2.0 | 12.9 | 0.16 | 297 | 0.86 |
| A-11 | Al₂O₃ | 0.3 | 2.6 | 13.1 | 0.15 | 369 | 0.64 |
| A-12 | Al₂O₃ | 1.0 | 3.5 | 14.2 | 0.18 | 359 | 0.50 |
| A-8 | Al₂O₃ | 4.0 | 3.6 | 14.1 | 0.17 | 415 | 0.41 |
| A-13 | Al₂O₃ | 10.0 | 3.4 | 13.8 | 0.16 | 412 | 0.44 |
| A-14 | Al₂O₃ | 15.0 | 3.1 | 13.3 | 0.16 | 393 | 0.50 |
| A-15 | Al₂O₃ | 20.0 | 2.2 | 11.0 | 0.18 | 260 | 0.62 |
| A-16 | Al₂O₃ | 25.0 | 1.6 | 7.0 | 0.17 | 239 | 0.94 |

From the results set out in Table 3, it is found that when the content of $Al_2O_3$ is in the range of 0.1 to 15.0 mol % (preferably 0.3 to 15.0 mol %), there are the advantages of the invention obtained: while higher MR performance is kept, the variation of the device's area resistivity is held back with much more improved film performance reliability.

Experimental Example III

As regards the makeup of the semiconductor oxide layer forming a part of the spacer layer in general and the zinc oxide that was its main ingredient in particular, there was experimentation carried out to learn the influences of the $Ga_2O_3$ content on the advantages of the invention. Note here that the area resistivity ($\Omega \cdot \mu m^2$) of the device was set at around 0.17 ($\Omega \cdot \mu m^2$) at which, as a result of the aforesaid Experimental Example I, there were good MR ratios obtained.

The results are tabulated in Table 4 given below.

TABLE 4

($Ga_2O_3$ Content)

| Sample No. | Semiconductor oxide layer | | | MR ratio (%) | Area resistivity AR of the device ($\Omega \cdot \mu m^2$) | Electroconductivity of the spacer layer (S/cm) | AR σ Normalized value |
|---|---|---|---|---|---|---|---|
| | Type of the additive | Amount of the additive (mol %) | Thickness T1 (nm) | | | | |
| Ref. 3 | — | — | 1.4 | 12.1 | 0.17 | 227 | 1.00 |
| G-10 | $Ga_2O_3$ | 0.1 | 2.0 | 12.9 | 0.15 | 322 | 0.86 |
| G-11 | $Ga_2O_3$ | 0.3 | 2.4 | 13.7 | 0.17 | 296 | 0.58 |
| G-12 | $Ga_2O_3$ | 1.0 | 2.8 | 14.9 | 0.16 | 365 | 0.43 |
| G-6 | $Ga_2O_3$ | 4.0 | 2.8 | 15.2 | 0.15 | 394 | 0.33 |
| G-13 | $Ga_2O_3$ | 10.0 | 2.8 | 14.6 | 0.16 | 370 | 0.36 |
| G-14 | $Ga_2O_3$ | 15.0 | 2.7 | 14.2 | 0.17 | 335 | 0.53 |
| G-15 | $Ga_2O_3$ | 20.0 | 1.6 | 12.6 | 0.16 | 236 | 0.67 |
| G-16 | $Ga_2O_3$ | 25.0 | 1.3 | 5.9 | 0.16 | 223 | 0.80 |

From the results set out in Table 4, it is found that when the content of $Ga_2O_3$ is in the range of 0.1 to 20.0 mol % (preferably 0.3 to 20.0 mol %), there are the advantages of the invention obtained: while higher MR performance is kept, the variation of the device's area resistivity is held back with much more improved film performance reliability.

Experimental Example IV

As regards the makeup of the semiconductor oxide layer forming a part of the spacer layer in general and the zinc oxide that was its main ingredient in particular, there was experimentation carried out to learn the influences of the $B_2O_3$ content on the advantages of the invention. Note here that the area resistivity ($\Omega \cdot \mu m^2$) of the device was set at around 0.17 ($\Omega \cdot \mu m^2$) at which, as a result of the aforesaid Experimental Example I, there were good MR ratios obtained.

The results are tabulated in Table 5 given below.

TABLE 5

($B_2O_3$ Content)

| Sample No. | Semiconductor oxide layer | | | MR ratio (%) | Area resistivity AR of the device ($\Omega \cdot \mu m^2$) | Electronconductivity of the spacer layer (S/cm) | AR σ Normalized value |
|---|---|---|---|---|---|---|---|
| | Type of the additive | Amount of the additive (mol %) | Thickness T1 (nm) | | | | |
| Ref. 3 | — | — | 1.4 | 12.1 | 0.17 | 227 | 1.00 |
| B-10 | $B_2O_3$ | 0.1 | 2.0 | 12.9 | 0.15 | 322 | 0.86 |
| B-11 | $B_2O_3$ | 0.3 | 2.3 | 13.1 | 0.17 | 302 | 0.64 |
| B-12 | $B_2O_3$ | 1.0 | 2.5 | 13.6 | 0.17 | 300 | 0.50 |
| B-5 | $B_2O_3$ | 4.0 | 2.4 | 13.6 | 0.17 | 305 | 0.52 |
| B-13 | $B_2O_3$ | 10.0 | 2.3 | 13.1 | 0.16 | 335 | 0.58 |
| B-14 | $B_2O_3$ | 15.0 | 2.0 | 12.1 | 0.18 | 260 | 0.53 |
| B-15 | $B_2O_3$ | 20.0 | 1.4 | 10.3 | 0.16 | 240 | 0.80 |
| B-16 | $B_2O_3$ | 25.0 | 1.0 | 5.4 | 0.16 | 202 | 1.58 |

From the results set out in Table 5, it is found that when the content of $B_2O_3$ is in the range of 0.1 to 15.0 mol % (preferably 0.3 to 15.0 mol %), there are the advantages of the invention obtained: while higher MR performance is kept, the variation of the device's area resistivity is held back with much more improved film performance reliability.

Experimental Example V

As regards the makeup of the semiconductor oxide layer forming a part of the spacer layer in general and the zinc oxide that was its main ingredient in particular, there was experimentation carried out to learn the influences of the $In_2O_3$ content on the advantages of the invention. Note here that the area resistivity ($\Omega \cdot \mu m^2$) of the device was set at around 0.17 ($\Omega \cdot \mu m^2$) at which, as a result of the aforesaid Experimental Example I, there were good MR ratios obtained.

The results are tabulated in Table 6 given below.

TABLE 6

(In$_2$O$_3$ Content)

| Sample No. | Semiconductor oxide layer | | | MR ratio (%) | Area resistivity AR of the device ($\Omega \cdot \mu m^2$) | Electroconductivity of the spacer layer (S/cm) | AR σ Normalized value |
|---|---|---|---|---|---|---|---|
| | Type of the additive | Amount of the additive (mol %) | Thickness T1 (nm) | | | | |
| Ref. 3 | — | — | 1.4 | 12.1 | 0.17 | 227 | 1.00 |
| I-10 | In$_2$O$_3$ | 0.1 | 2.0 | 12.9 | 0.15 | 322 | 0.86 |
| I-11 | In$_2$O$_3$ | 0.3 | 2.0 | 12.8 | 0.16 | 292 | 0.61 |
| I-12 | In$_2$O$_3$ | 1.0 | 2.0 | 12.6 | 0.16 | 305 | 0.47 |
| I-4 | In$_2$O$_3$ | 4.0 | 2.0 | 12.4 | 0.14 | 356 | 0.50 |
| I-13 | In$_2$O$_3$ | 10.0 | 2.0 | 12.2 | 0.15 | 332 | 0.53 |
| I-14 | In$_2$O$_3$ | 15.0 | 1.9 | 12.0 | 0.15 | 309 | 0.46 |
| I-15 | In$_2$O$_3$ | 20.0 | 1.6 | 10.4 | 0.16 | 273 | 0.58 |
| I-16 | In$_2$O$_3$ | 25.0 | 1.5 | 7.3 | 0.16 | 257 | 0.73 |

From the results set out in Table 6, it is found that when the content of In$_2$O$_3$ is in the range of 0.1 to 15.0 mol % (preferably 0.3 to 15.0 mol %), there are the advantages of the invention obtained: while higher MR performance is kept, the variation of the device's area resistivity is held back with much more improved film performance reliability.

Experimental Example VI

As regards the makeup of the semiconductor oxide layer forming a part of the spacer layer in general and the zinc oxide that was its main ingredient in particular, there was experimentation carried out to learn the influences of the TiO$_2$ content on the advantages of the invention. Note here that the area resistivity (Ω·μm$^2$) of the device was set at around 0.17 (Ω·μm$^2$) at which, as a result of the aforesaid Experimental Example I, there were good MR ratios obtained.

The results are tabulated in Table 7 given below.

TABLE 7

(TiO$_2$ Content)

| Sample No. | Semiconductor oxide layer | | | MR ratio (%) | Area resistivity AR of the device ($\Omega \cdot \mu m^2$) | Electroconductivity of the spacer layer (S/cm) | AR σ Normalized value |
|---|---|---|---|---|---|---|---|
| | Type of the additive | Amount of the additive (mol %) | Thickness T1 (nm) | | | | |
| Ref. 3 | — | — | 1.4 | 12.1 | 0.17 | 227 | 1.00 |
| T-10 | TiO$_2$ | 0.1 | 2.0 | 12.9 | 0.15 | 322 | 0.86 |
| T-11 | TiO$_2$ | 0.3 | 2.0 | 13.2 | 0.17 | 275 | 0.56 |
| T-12 | TiO$_2$ | 1.0 | 2.0 | 14.3 | 0.16 | 290 | 0.50 |
| T-4 | TiO$_2$ | 4.0 | 2.0 | 15.2 | 0.19 | 231 | 0.56 |
| T-13 | TiO$_2$ | 10.0 | 2.1 | 13.6 | 0.17 | 281 | 0.55 |
| T-14 | TiO$_2$ | 15.0 | 1.9 | 13.0 | 0.15 | 295 | 0.39 |
| T-15 | TiO$_2$ | 20.0 | 1.5 | 12.3 | 0.14 | 312 | 0.64 |
| T-16 | TiO$_2$ | 25.0 | 1.4 | 7.8 | 0.16 | 242 | 0.67 |

From the results set out in Table 7, it is found that when the content of TiO$_2$ is in the range of 0.1 to 20.0 mol % (preferably 0.3 to 20.0 mol %), there are the advantages of the invention obtained: while higher MR performance is kept, the variation of the device's area resistivity is held back with much more improved film performance reliability.

Experimental Example VII

There was experimentation carried out to learn the influences on the advantages of the invention of the thicknesses $T_{11}$ and $T_{22}$ of the first and the second non-magnetic metal layer, each forming a part of the spacer layer.

CPP-GMR device samples having such multilayer structure as shown in Tables 8 and 9 given below were each formed by sputtering and readied up for experimentation. Note here that the specific samples were prepared pursuant to the aforesaid method. In the same sample No., the thicknesses $T_{11}$ and $T_{12}$ of the first and the second non-magnetic metal layer were the same.

The results of experimentation were tabulated in Table 9 given below.

TABLE 8

| Multilayer structure | | Layer material | Thickness (nm) |
|---|---|---|---|
| Protective layer | | Ru | 2.0 |
| Free layer | | Co70Fe30 | 4.0 |
| Spacer layer | 2$^{nd}$ | Cu | $T_{22}$ |

TABLE 8-continued

| Multilayer structure | | Layer material | Thickness (nm) |
|---|---|---|---|
| | Nonmagnetic metal layer | | |
| | Semiconductor oxide layer | ZnO + Al$_2$O$_3$ (4 mol %) | 3.6 |
| | 1$^{st}$ Nonmagnetic metal layer | Cu | T$_{11}$ |
| Fixed magnetization layer | Inner layer | Co70Fe30 | 3.5 |
| | Nonmagnetic intermediate layer | Ru | 0.7 |
| | Outer layer | Co70Fe30 | 3.0 |
| Antiferromagnetic layer | | IrMn | 5.0 |
| Underlay layer | | NiCr | 4.0 |

TABLE 9

| Sample No. | T$_{11}$, T$_{22}$ (nm) | Area resistivity of the device AR (Ω·μm$^2$) | Electro-conductivity of the spacer (S/cm) | MR ratio (%) |
|---|---|---|---|---|
| A-17 | 0.2 | 0.18 | 289 | 10.1 |
| A-18 | 0.3 | 0.18 | 308 | 13.7 |
| A-8  | 0.7 | 0.17 | 415 | 14.1 |
| A-19 | 1.5 | 0.16 | 571 | 13.0 |
| A-20 | 2.0 | 0.15 | 714 | 12.9 |
| A-21 | 2.5 | 0.11 | 1293 | 12.4 |

From the results set out in Table 9, it is found that as the thickness $T_{11}$, $T_{12}$ of the first, and the second nonmagnetic metal layer is less than 0.3 nm, there is an MR ratio drop. A possible reason for this could be that as the thickness $T_{11}$, $T_{22}$ of the first, and the second nonmagnetic metal layer becomes too small, the first and the second nonmagnetic metal layer are incapable of growing continuously; they remain in islands form with the result that the metal and semiconductor coexist near the interface between the first and second nonmagnetic metal layers and the semiconductor oxide layer, ending up with the likelihood of spin-polarized spins being scattered. When the thicknesses $T_{11}$ and $T_{22}$ of the first and the second nonmagnetic metal layer grow too greater than 2.0 nm, too, there is again an MR ratio drop. A possible reason for this could be some considerable scattering of spin-polarized spins in the first and the second nonmagnetic metal layer.

Such phenomena also go to cases where the material of the first, and the second nonmagnetic metal layer is other than Cu. The thicknesses $T_{11}$ and $T_{22}$ of the first and the second nonmagnetic metal layer may be different from each other insofar as they are in the range of 0.3 to 2.0 nm. The preferable thicknesses $T_{11}$ and $T_{22}$ of the first and the second nonmagnetic metal layer also hold for other semiconductor oxide layers according to the invention.

The present invention may be applicable to the industry of hard disk systems comprising a magneto-resistive effect device for reading the magnetic field of magnetic recording media or the like as signals.

What we claim is:

1. A giant magneto-resistive effect device (CPP-GMR device) having a CPP (current perpendicular to plane) structure comprising a spacer layer, and a fixed magnetization layer and a free layer stacked one upon another with said spacer layer interposed between them, with a sense current applied in a stacking direction, characterized in that: said free layer functions such that a magnetization direction changes depending on an external magnetic field, and said spacer layer comprises a first nonmagnetic metal layer and a second nonmagnetic metal layer, each formed of a nonmagnetic metal material, and a semiconductor oxide layer interposed between the first nonmagnetic metal layer and the second nonmagnetic metal layer, wherein:

the semiconductor oxide layer forming a part of said spacer layer comprises zinc oxide as a main ingredient, wherein said main ingredient zinc oxide contains at least one selected from among oxides containing a trivalent cation of Al$_2$O$_3$, Ga$_2$O$_3$, In$_2$O$_3$, and B$_2$O$_3$, and a tetravalent cation of TiO$_2$.

2. The magneto-resistive effect device according to claim 1, wherein said main ingredient zinc oxide contains at least one selected from among oxides containing a trivalent cation of Al$_2$O$_3$, Ga$_2$O$_3$, In$_2$O$_3$, and B$_2$O$_3$ in substitutional solid solution form.

3. The magneto-resistive effect device according to claim 1, wherein the content of the trivalent cation-containing oxide and the tetravalent cation-containing oxide contained in said main ingredient zinc oxide is such that the semiconductor oxide layer can have lower resistance yet a larger thickness without deterioration of MR performance.

4. The magneto-resistive effect device according to claim 3, wherein the content of Al$_2$O$_3$ contained in said main ingredient zinc oxide is 0.1 to 15.0 mol %.

5. The magneto-resistive effect device according to claim 3, wherein the content of Ga$_2$O$_3$ contained in said main ingredient zinc oxide is 0.1 to 20.0 mol %.

6. The magneto-resistive effect device according to claim 3, wherein the content of B$_2$O$_3$ contained in said main ingredient zinc oxide is 0.1 to 15.0 mol %.

7. The magneto-resistive effect device according to claim 3, wherein the content of In$_2$O$_3$ contained in said main ingredient zinc oxide is 0.1 to 15.0 mol %.

8. The magneto-resistive effect device according to claim 3, wherein the content of TiO$_2$ contained in said main ingredient zinc oxide is 0.1 to 20.0 mol %.

9. The magneto-resistive effect device according to claim 1, wherein the semiconductor oxide layer forming a part of said spacer layer has a thickness of 2.0 to 4.0 nm.

10. The magneto-resistive effect device according to claim 1, wherein said first nonmagnetic metal layer, and said second nonmagnetic metal layer is at least one selected from among Cu, Au, and Ag.

11. The magneto-resistive effect device according to claim 1, wherein said first nonmagnetic metal layer, and said second nonmagnetic metal layer has a thickness of 0.3 to 2.0 nm.

12. The magneto-resistive effect device according to claim 1, which has an area resistivity of 0.1 to 0.3 Ω·μm$^2$.

13. The magneto-resistive effect device according to claim 1, wherein said spacer layer has an electro-conductivity of 100 to 1,450 (S/cm).

14. A thin-film magnetic head, characterized by comprising a plane opposite to a recoding medium, a magneto-resistive effect device as recited in claim 1, which is located near said medium opposite plane for detecting a signal magnetic field from said recording medium, and a pair of electrodes for passing a current in the stacking direction of said magneto-resistive effect device.

15. A head gimbal assembly, characterized by comprising:

a slider including a thin-film magnetic head as recited in claim 14 and located in opposition to a recording medium, and a suspension adapted to resiliently support said slider.

16. A hard disk system, characterized by comprising:

a slider including a thin-film magnetic head as recited in claim 14 and located in opposition to a recording medium, and a positioning means adapted to support and position said slider with respect to said recording medium.

* * * * *

UNITED STATES PATENT AND TRADEMARK OFFICE
CERTIFICATE OF CORRECTION

| | | |
|---|---|---|
| PATENT NO. | : 7,920,362 B2 | Page 1 of 1 |
| APPLICATION NO. | : 11/943171 | |
| DATED | : April 5, 2011 | |
| INVENTOR(S) | : Shinji Hara et al. | |

It is certified that error appears in the above-identified patent and that said Letters Patent is hereby corrected as shown below:

On the title page, Item (54), and column 1, lines 1-4, the title is incorrect. Title Page, Item (54) and column 1, lines 1-4, should read:

-- MAGNETO-RESISTIVE DEVICE INCLUDING A MULTI-LAYER SPACER WHICH INCLUDES A SEMICONDUCTOR OXIDE LAYER --

Signed and Sealed this

Thirty-first Day of May, 2011

David J. Kappos
*Director of the United States Patent and Trademark Office*